US012752594B2

(12) United States Patent
Mayer et al.

(10) Patent No.: US 12,752,594 B2
(45) Date of Patent: Oct. 6, 2026

(54) HEATING VENTILATION AND AIR CONDITIONING UNIT

(71) Applicant: VALEO SYSTEMES THERMIQUES, La Verriere (FR)

(72) Inventors: Timothy Mayer, Auburn Hills, MI (US); Cody Barnebee, Auburn Hills, MI (US); Steven Marshall, Auburn Hills, MI (US); Steve Hruska, Auburn Hills, MI (US); James Salo, Auburn Hills, MI (US); Jason Kreucher, Auburn Hills, MI (US)

(73) Assignee: VALEO ELECTRIFICATION, Cergy Pontoise (FR)

( * ) Notice: Subject to any disclaimer, the term of this patent is extended or adjusted under 35 U.S.C. 154(b) by 391 days.

(21) Appl. No.: 18/529,411

(22) Filed: Dec. 5, 2023

(65) Prior Publication Data

US 2025/0178407 A1 Jun. 5, 2025

(51) Int. Cl.
*B60H 1/00* (2006.01)

(52) U.S. Cl.
CPC ..... *B60H 1/00842* (2013.01); *B60H 1/00028* (2013.01); *B60H 1/00685* (2013.01); *B60H 2001/00092* (2013.01)

(58) Field of Classification Search
CPC ............ B60H 1/00842; B60H 1/00028; B60H 1/00685; B60H 2001/00092
USPC .......................................................... 454/141
See application file for complete search history.

(56) References Cited

U.S. PATENT DOCUMENTS

| | | | | |
|---|---|---|---|---|
| 6,371,202 | B1 * | 4/2002 | Takano | B60H 1/00914 165/203 |
| 7,357,176 | B2 * | 4/2008 | Yelles | B60H 1/00849 62/133 |
| 9,676,245 | B2 * | 6/2017 | Clemence | B60H 1/00021 |
| 9,821,626 | B2 * | 11/2017 | Wittmann | B60H 1/034 |
| 11,458,806 | B2 | 10/2022 | Haupt et al. | |
| 2022/0379685 | A1 * | 12/2022 | Buckman | B60H 1/00678 |
| 2023/0286352 | A1 * | 9/2023 | Haupt | B60H 1/00564 |

FOREIGN PATENT DOCUMENTS

| | | | | |
|---|---|---|---|---|
| FR | 3150473 | A1 * | 1/2025 | B60H 1/248 |

* cited by examiner

*Primary Examiner* — Avinash A Savani
*Assistant Examiner* — Dana K Tighe
(74) *Attorney, Agent, or Firm* — VALEO ELECTRIFICATION

(57) ABSTRACT

An HVAC unit including: a case defining a first aperture, a second aperture, a third aperture, and an outlet aperture, a first door rotatably attached to the case, a second door, rotatably attached to the case, and a third door rotatably attached to the case, with the first door being arranged to partially allow the exterior airflow in its closed position.

20 Claims, 6 Drawing Sheets

HEATING VENTILATION AND AIR CONDITIONING UNIT

TECHNICAL FIELD

The present disclosure relates to a Heating Ventilation and Air Conditioning (HVAC) unit for a vehicle.

BACKGROUND OF THE INVENTION

Vehicles are known to incorporate HVAC units to improve the comfort of the people within the passenger compartment of the vehicle. The HVAC units heat and cool air blown through the HVAC unit using a heating heat exchanger and/or a cooling heat exchanger. A blower device is commonly used to ensure movement of the air within the HVAC unit. The heating heat exchanger typically utilizes the engine coolant as a source of heat for heating the air. The cooling heat exchanger is typically an evaporator, which is part of an air conditioning unit in the vehicle powered by the engine of the vehicle. The air blown through the HVAC unit comes from air outside the vehicle, air inside the passenger compartment of the vehicle or a combination of the air outside the vehicle and the air inside the passenger compartment of the vehicle. The air being blown through the HVAC unit is conditioned (heated/cooled) and is then directed into the passenger compartment of the vehicle through one or more outlet vents.

SUMMARY OF THE INVENTION

An object of the invention is a heating, ventilation and air conditioning unit comprising: a case defining a first aperture, a second aperture, a third aperture, and an outlet aperture, the first aperture being arranged to receive an exterior airflow, the second aperture being arranged to receive a first interior airflow, the third aperture being arranged to receive a second interior airflow, the outlet aperture being arranged to evacuate air outside of the case; a first door rotatably attached to the case, the first door being movable between an open position where the first aperture is open, a closed position where the first aperture is closed, and a partially-open position where the first aperture is partially open; a second door, rotatably attached to the case, the second door being movable between an open position where the second aperture is open and a closed position where the second aperture is closed; and a third door rotatably attached to the case, the third door being movable between an open position where the third aperture is open, a closed position where the third aperture is closed; wherein the first door is arranged to partially allow the exterior airflow in its closed position.

In one example, the first door includes openings.

In one example, the case defines a fourth aperture arranged between the first aperture and the outlet aperture, with the third door being configured to assume a position in which it seals the fourth aperture so that the exterior airflow is prevented from reaching the outlet aperture.

In one example, the third door seals the fourth aperture when is it in open position with respect to the third aperture.

In one example, the heating, ventilation and air conditioning unit defines a fresh air mode in which the first door is in the open position, the second door is in the closed position, and the third door is in the closed position.

In one example, the heating, ventilation and air conditioning unit defines a partial-recirculation air mode in which the first door is in the partially-open position, the second door is in the open position, and the third door is in the closed position.

In one example, the heating, ventilation and air conditioning unit defines a recirculation air mode in which the first door is in the closed position, the second door is in the open position, and the third door is in the open position.

In one example, the heating, ventilation and air conditioning unit defines a fresh ram air mode, in which the first door is in the closed position, the second door is in the closed position, and the third door is in the closed position.

In one example, the heating, ventilation and air conditioning unit defines a partial-recirculation ram air mode in which the first door is in the closed position, the second door is in the open position, and the third door is in the closed position.

In one example, the heating, ventilation and air conditioning unit defines a soft recirculation air mode in which the first door is in the closed position, the second door is in the closed position, and the third door is in the open position.

In one example, the heating, ventilation and air conditioning unit further comprises a filter arranged downstream the first, second and third apertures and upstream of the outlet aperture.

In one example, the filter is arranged downstream the fourth aperture.

In one example, the heating, ventilation and air conditioning unit is arranged for mounting in a vehicle so that the first aperture faces a forward direction of a vehicle in which the HVAC unit is intended to be mounted.

In one example, the heating, ventilation and air conditioning unit is arranged for mounting in a vehicle so that the second aperture faces an upward direction of a vehicle in which the HVAC unit is intended to be mounted, the upward direction being opposite a ground facing direction.

In one example, the heating, ventilation and air conditioning unit is arranged for mounting in a vehicle so that the third aperture faces a forward direction of a vehicle in which the HVAC unit is intended to be mounted.

In one example, the first door is a butterfly type door.

In one example, the second door is a barrel type door.

In one example, the third door is a barrel type door.

BRIEF DESCRIPTION OF DRAWINGS

The present invention will be described in greater detail below with reference to the drawings. In the drawings.

DETAILED DESCRIPTION OF THE INVENTION

Figure 1:
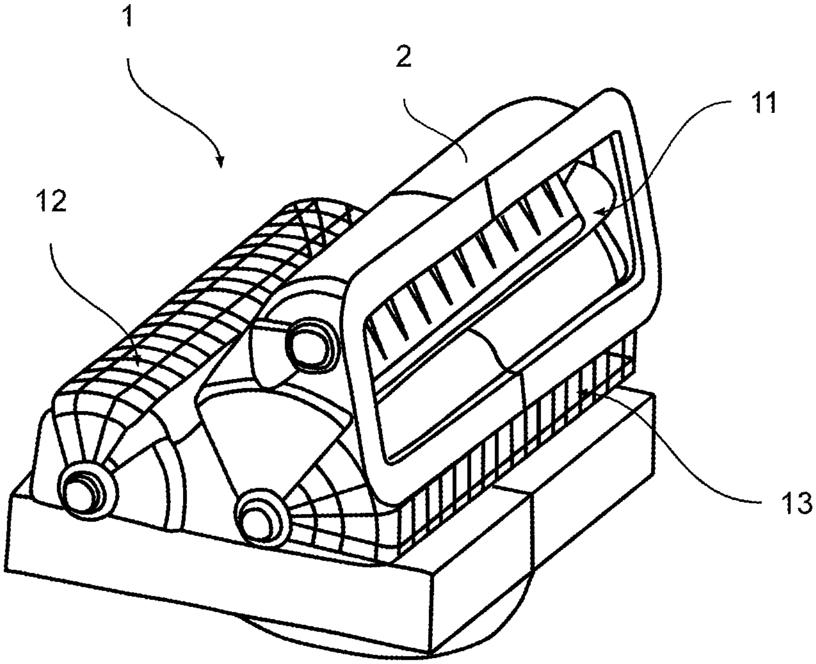
FIG. 1 shows an HVAC unit in a perspective view.
Figure 2:
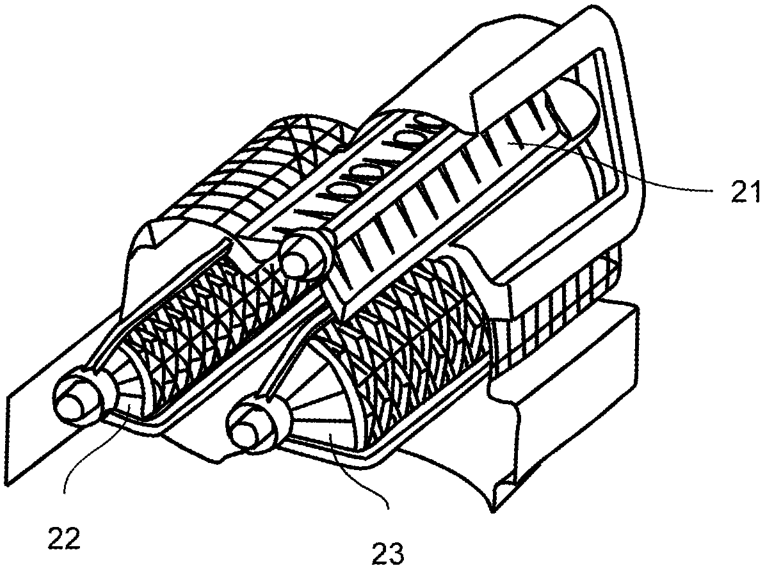
FIG. 2 shows the HVAC unit of FIG. 1 with part of its case removed.

FIG. 1 shows a heating, ventilation and air conditioning (HVAC) unit 1 in a perspective view, with FIG. 2 showing the HVAC unit 1 of FIG. 1 with part of its case 2 removed for clarity. A HVAC unit 1 includes the case 2 to manage the airflow that is intended to be distributed into the vehicle interior, and can be part of a wider HVAC system, for example further including a blower, heat exchangers and distribution channels.

The case 2 defines a first aperture 11, a second aperture 12, a third aperture 13 and an outlet aperture 15.

The first aperture 11 is arranged to receive an exterior airflow. The exterior airflow can be for example air coming from outside of the vehicle. The HVAC unit 1 can be arranged for mounting in a vehicle so that the first aperture 11 faces a forward direction of a vehicle in which the HVAC unit 1 is intended to be mounted. Consequently, ram air can enter through the first aperture 11 when the vehicle is moving.

The second aperture 12 is arranged to receive a first interior airflow. The first interior airflow can be airflow coming from cabin of the vehicle. The HVAC unit 1 can be arranged for mounting in a vehicle so that the second aperture 12 faces an upward direction of a vehicle in which the HVAC unit 1 is intended to be mounted, the upward direction being opposite a ground facing direction. The second aperture 12 can be intended to receive air from panel of the cabin.

The third aperture 13 is arranged to receive a second interior airflow. The second interior airflow can be airflow coming from cabin of the vehicle. The HVAC unit 1 can be arranged for mounting in a vehicle so that the third aperture 13 faces a forward direction of a vehicle in which the HVAC unit 1 is intended to be mounted. Such arrangement allows to decrease the amount of noise perceived by passengers of the vehicle. In one example, the second interior airflow is sufficient for normal needs of air conditioning system.

The first interior airflow and the second interior airflow can have a common source of air, e.g., the cabin. By having two separate apertures (the second aperture 12 and the third aperture 13) for drawing the interior airflow it is possible to provide a quieter operation in some modes, and more effective, noisier operation in other modes.

The outlet aperture 15 is arranged to evacuate air outside of the case 2. For example, the outlet aperture 15 can be arranged to open onto the blower (not shown), which can be used to induce airflow and draw it from the case 2 towards further distribution channels, heat exchangers etc. of the HVAC system.

Figure 3:
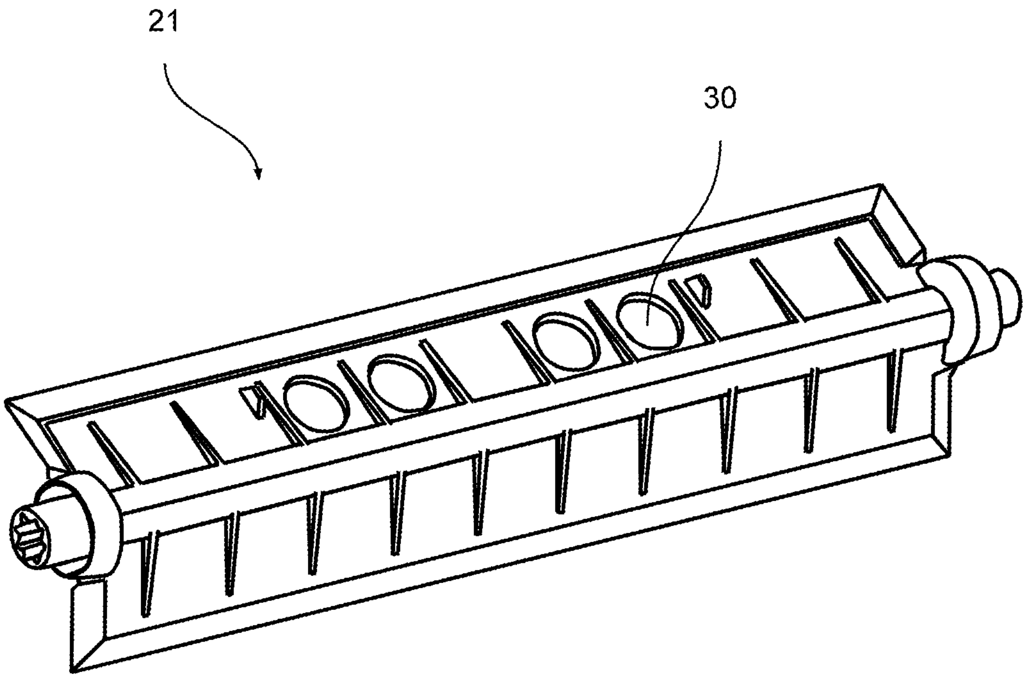
FIG. 3 shows an example of a first door for an exterior airflow aperture.

The HVAC unit 1 further includes a first door 21 rotatably attached to the case 2. The first door 21 is movable between an open position where the first aperture 11 is open, a closed position where the first aperture is closed, and a partially-open position where the first aperture 11 is partially open. The first door 21 can be further capable of adopting any intermediate position between these positions. In the open position, the first door 21 is oriented so as to maximize the airflow through the first aperture 11. In the closed position, the first door 21 is oriented so as to come into abutment with a wall of the case 2 so that the outline of the first aperture 11 is sealed with the first door 21. However, the first door 21 is arranged to partially allow the exterior airflow in its closed position. For example, the first door 21 can include openings 30 as shown in FIG. 3. In the partially-open position the first door 21 is oriented so as to decrease the cross-section of the first aperture 11 available for the airflow to pass through, while still allowing it. In one example, the first door 21 in the closed position allows for a smaller airflow to pass through the first aperture 11 compared to the partially-open position.

The HVAC unit 1 further includes a second door 22, rotatably attached to the case 2. The second door 22 can be movable between an open position where the second aperture 12 is open and a closed position where the second aperture 12 is closed. The second door 22 can be further capable of adopting any intermediate position between these positions. In the open position, the second door 22 is oriented so as to maximize the airflow through the second aperture 12. In the closed position, the second door is oriented so as to come into abutment with a wall of the case 2 so that the outline of the second aperture 12 is sealed with the second door.

The HVAC unit 1 further includes a third door 23, rotatably attached to the case 2. The third door 23 can be movable between an open position where the third aperture 13 is open, a closed position where the third aperture 13 is closed. The third door 23 can be further capable of adopting any intermediate position between these positions. In the open position, the third door 23 is oriented so as to maximize the airflow through the third aperture 13. In the closed position, the third door 23 is oriented so as to come into abutment with a wall of the case 2 so that the outline of the third aperture 13 is sealed with the third door.

In the shown example, the first door 21 is a butterfly type door.

In the shown example, the second door 22 is a barrel type door.

In the shown example, the third door 23 is a barrel type door.

FIG. 3 shows an example of the first door 21 for an exterior airflow aperture, i.e. the first aperture 11.

Figure 4:
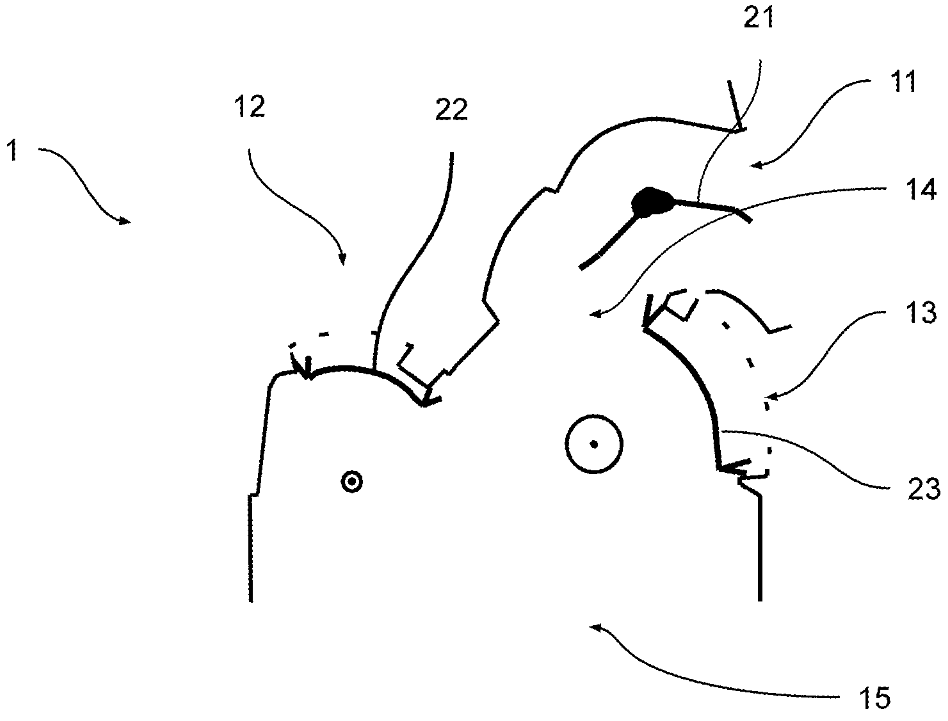
FIG. 4 shows schematically the HVAC unit in a fresh air mode.

FIG. 4 shows schematically the HVAC unit 1 in a fresh air mode. The HVAC unit 1 can define the fresh air mode in which the first door 21 is in the open position, the second door 22 is in the closed position, and the third door 23 is in the closed position. In the fresh mode, the air introduced into the case 2 is coming only form the exterior of the vehicle.

Figure 5:
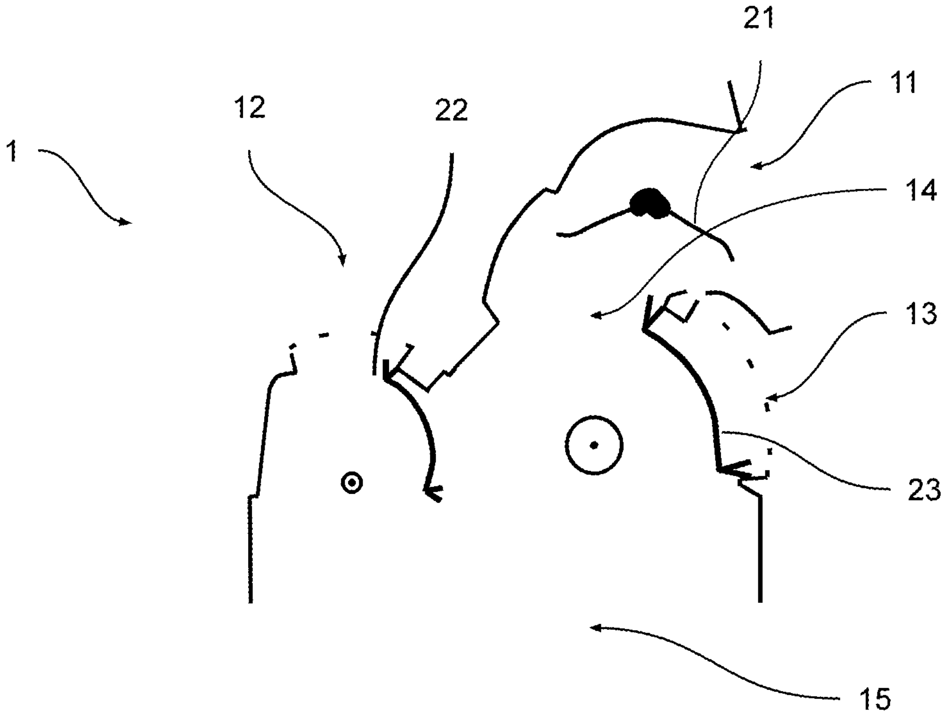
FIG. 5 shows schematically the HVAC unit in a partial-recirculation air mode.

FIG. 5 shows schematically the HVAC unit in a partial-recirculation air mode. The HVAC unit 1 can define the partial-recirculation air mode in which the first door 21 is in the partially-open position, the second door 22 is in the open position, and the third door 23 is in the closed position. In the partial-recirculation air mode, the air introduced into the case 2 is partly air coming from the exterior of the vehicle and partly the first interior airflow. The first door 21 can be in the partially-open position, as opposed to fully open position, to compensate for the first interior airflow also entering the HVAC unit 1.

Figure 6:
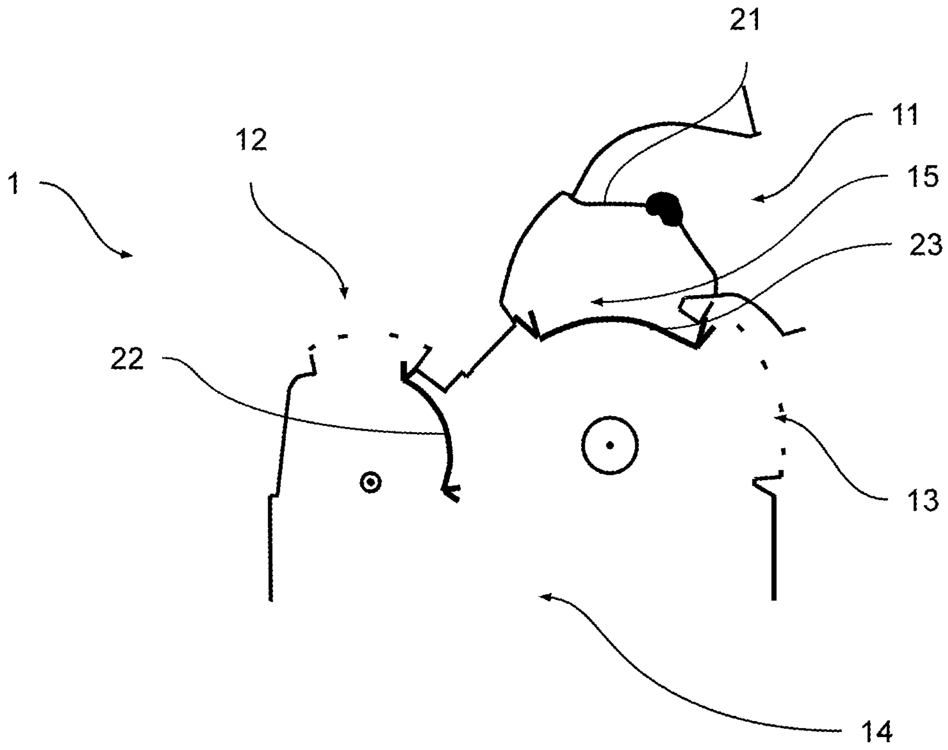
FIG. 6 shows schematically the HVAC unit in recirculation air mode.

FIG. 6 shows schematically the HVAC unit in recirculation air mode.

In general, the case 2 can define a fourth aperture 14 arranged between the first aperture 11 and the outlet aperture 15, with the third door 23 being configured to assume a position in which it seals the fourth aperture 14 so that the exterior airflow is prevented from reaching the outlet aperture 15. Since the apertures dealing with the interior airflow (the second aperture 12 and the third aperture 13) are open, it is possible to draw more cabin air into the unit. In this example, this can lead to increased noise to the passengers as the second aperture 12 may be arranged closer to them, consequently exposing them to noise to a greater extent.

The third door 23 can seal the fourth aperture 14 when is it in open position with respect to the third aperture 13. Consequently, a single door allows controlling a more complex configuration, and allows saving cost.

The HVAC unit 1 can define the recirculation air mode in which the first door 21 is in the closed position, the second door 22 is in the open position, and the third door 23 is in the open position. In the recirculation air mode, the air introduced into the case 2 is partly air coming with the first interior airflow and partly air coming with the second interior airflow. The exterior airflow is prevented from entering the case 2 and mixing with the air from the first interior airflow and from the second interior airflow.

A dedicated door (the first door 21) for ram air allows for double sealing when in maximal recirculation air mode, which helps ensuring a quick and effective cool down. The external airflow (e.g. ram air) is fully prevented from entering the case 2. This reduces risk for ram air whistle due to double sealing.

Figure 7:
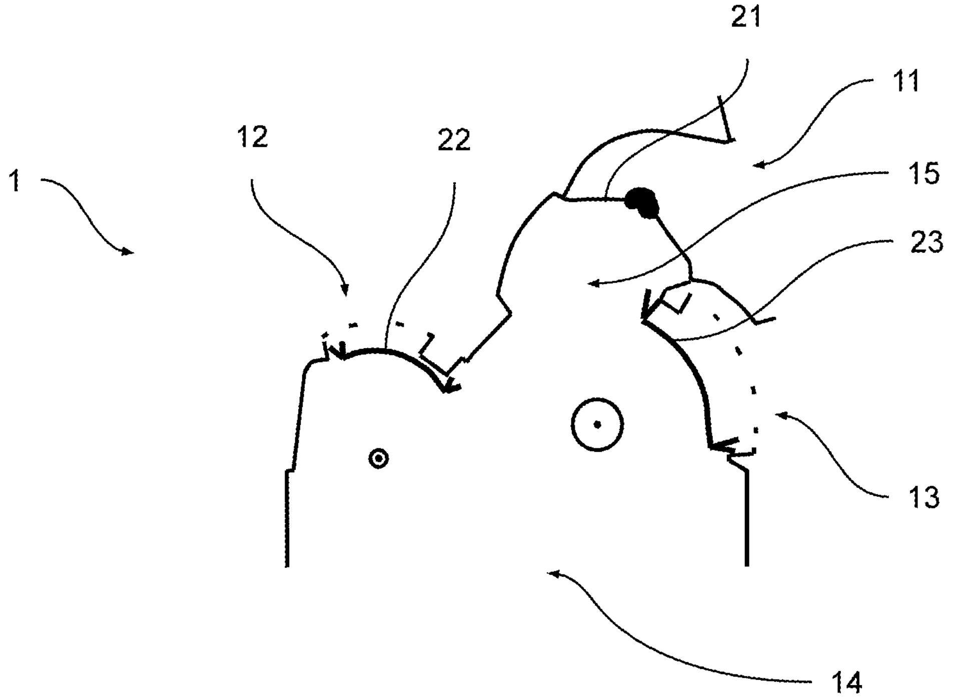
FIG. 7 shows schematically the HVAC unit in a fresh ram air mode.

FIG. 7 shows schematically the HVAC unit in a fresh ram air mode. The HVAC unit 1 can define the fresh ram air mode, in which the first door 21 is in the closed position, the second door 22 is in the closed position, and the third door 23 is in the closed position. In the fresh ram air mode, the air introduced into the case 2 is solely a portion of the exterior airflow that would normally enter through the first aperture 11. Since the first door 21 is arranged to partially allow the exterior airflow in its closed position, for example through openings 30, the ram air is allowed to enter the case 2. This mode can be applicable at high speeds, where ram air is significant enough to meet the requirements of the system.

Figure 8:
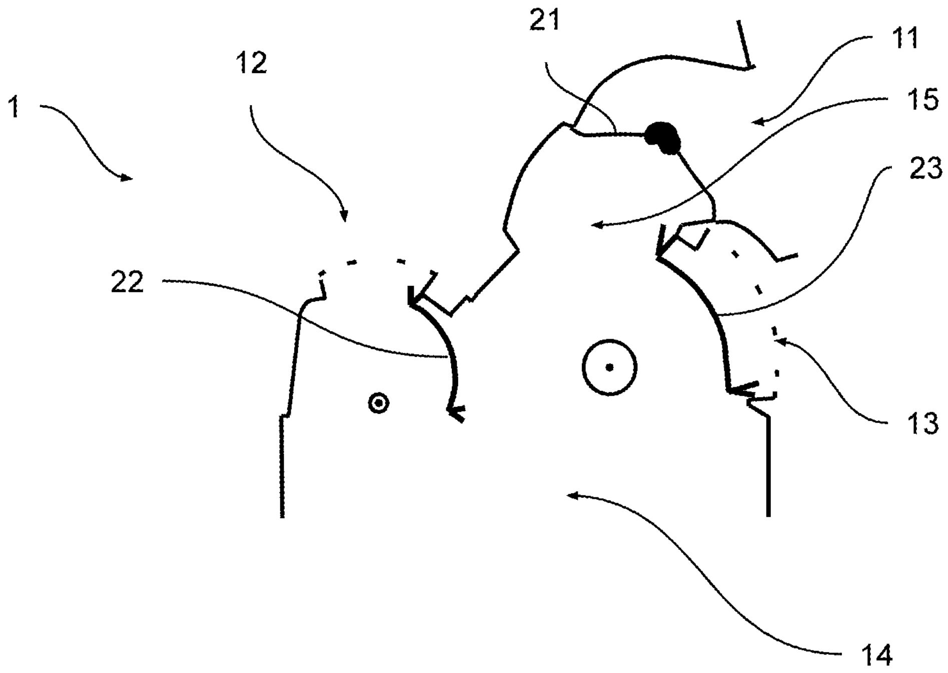
FIG. 8 shows schematically the HVAC unit in a partial-recirculation ram air mode.

FIG. 8 shows schematically the HVAC unit in a partial-recirculation ram air mode. The HVAC unit 1 can define the partial-recirculation ram air mode in which the first door 21 is in the closed position, the second door 22 is in the open position, and the third door 23 is in the closed position. In the partial-recirculation ram air mode, the air introduced into the case 2 is partly a portion of the exterior airflow passing through the first aperture 11 with the first door 21 in the closed position, and partly the air coming with the first internal airflow. The second internal airflow is not entering the case 2 as the third door 23 is in its closed position with respect to the third aperture 13. The ram air can be used together with the interior airflow (first interior airflow) to meet the requirements of the system.

Figure 9:
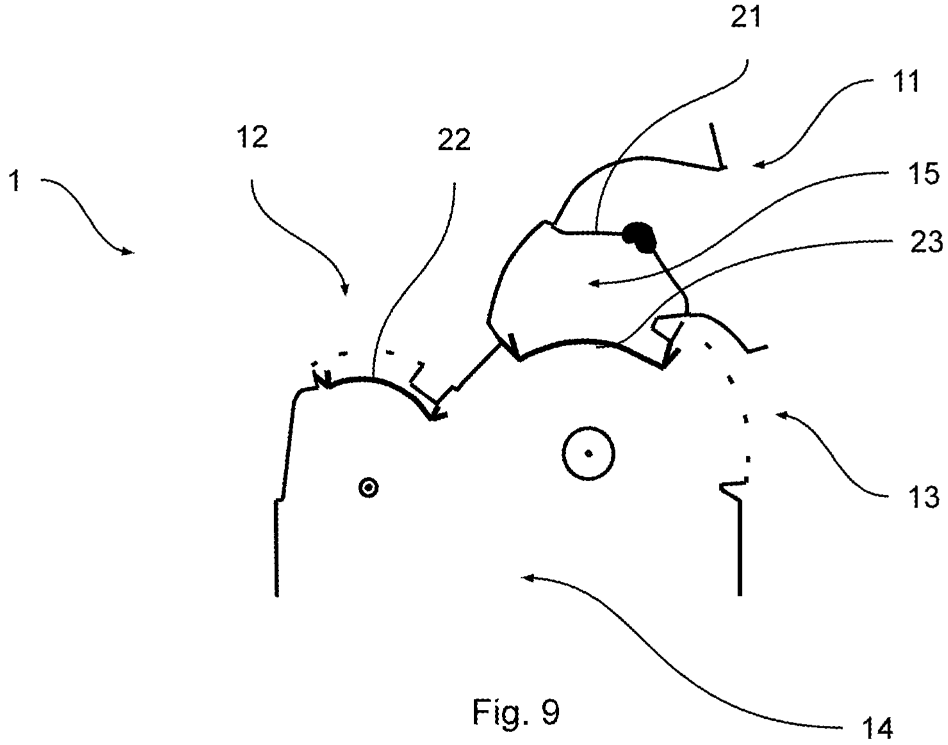
FIG. 9 shows schematically the HVAC unit in a soft recirculation air mode.

FIG. 9 shows schematically the HVAC unit in a soft recirculation air mode. The HVAC unit 1 can define the soft recirculation air mode in which the first door 21 is in the closed position, the second door 22 is in the closed position, and the third door 23 is in the open position. In the soft recirculation air mode, the air introduced into the case 2 is only the air coming with the second interior airflow. As the third aperture 13 is facing away from the cabin, the amount of noise reaching the cabin is lower. A dedicated door (the first door 21) for ram air allows for double sealing when in soft recirculation air mode. The external airflow (e.g. ram air) is fully prevented from entering the case 2. This reduces risk for ram air whistle due to double sealing.

Figure 10:
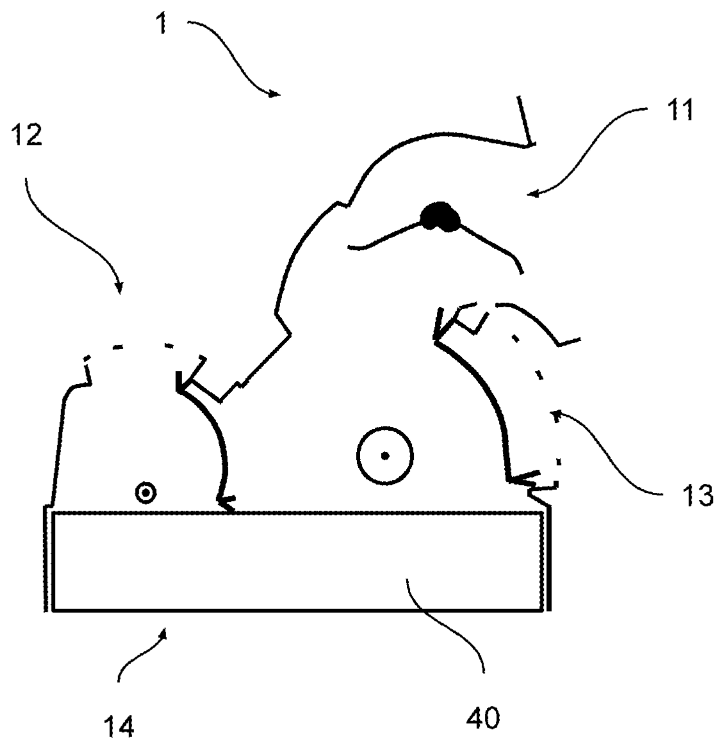
FIG. 10 shows schematically the HVAC unit with a filter.

FIG. 10 shows schematically the HVAC unit further comprising a filter 40. The filter 40 can be arranged downstream the first, second and third apertures 11, 12, 13 and upstream of the outlet aperture 15.

In one example, the filter 40 can be arranged downstream the fourth aperture 14.

In general, the proposed configuration of doors allows for complete and precise control of the ram air in various operating modes of the HVAC unit 1.

The invention claimed is:

1. A heating, ventilation and air conditioning unit comprising:

a case defining a first aperture, a second aperture, a third aperture, and an outlet aperture, the first aperture being arranged to receive an exterior airflow, the second aperture being arranged to receive a first interior airflow, the third aperture being arranged to receive a second interior airflow, the outlet aperture being arranged to evacuate air outside of the case;

a first door rotatably attached to the case, the first door being movable between an open position where the first aperture is open, a closed position where the first aperture is closed, and a partially-open position where the first aperture is partially open;

a second door, rotatably attached to the case, the second door being movable between an open position where the second aperture is open and a closed position where the second aperture is closed; and a third door rotatably attached to the case, the third door being movable between an open position where the third aperture is open, a closed position where the third aperture is closed;

wherein the first door is arranged to partially allow the exterior airflow in its closed position; and wherein the case defines a fourth aperture arranged between the first aperture and the outlet aperture, with the third door being configured to assume a position in which it seals the fourth aperture so that the exterior airflow is prevented from reaching the outlet aperture.

2. The heating, ventilation and air conditioning unit according to claim 1, wherein the first door includes openings.

3. The heating, ventilation and air conditioning unit according to claim 1, wherein the third door seals the fourth aperture when it is in an open position with respect to the third aperture.

4. The heating, ventilation and air conditioning unit according to claim 1, wherein the heating, ventilation and air conditioning unit defines a fresh air mode in which the first door is in the open position,
the second door is in the closed position, and
the third door is in the closed position.

5. The heating, ventilation and air conditioning unit according to claim 1, wherein the heating, ventilation and air conditioning unit defines a partial-recirculation air mode in which the first door is in the partially-open position,
the second door is in the open position, and
the third door is in the closed position.

6. The heating, ventilation and air conditioning unit according to claim 1, wherein the heating, ventilation and air conditioning unit defines a recirculation air mode in which the first door is in the closed position,
the second door is in the open position,
and the third door is in the open position.

7. The heating, ventilation and air conditioning unit according to claim 1, wherein the heating, ventilation and air conditioning unit defines a fresh ram air mode, in which the first door is in the closed position,
the second door is in the closed position,
and the third door is in the closed position.

8. The heating, ventilation and air conditioning unit according to claim 1, wherein the heating, ventilation and air conditioning unit defines a partial-recirculation ram air mode in which the first door is in the closed position,
the second door is in the open position,
and the third door is in the closed position.

9. The heating, ventilation and air conditioning unit according to claim 1, wherein the heating, ventilation and air conditioning unit defines a soft recirculation air mode in which
the first door is in the closed position,
the second door is in the closed position,
and the third door is in the open position.

10. The heating, ventilation and air conditioning unit according to claim 1, further comprising a filter arranged downstream of the first, second and third apertures and upstream of the outlet aperture.

11. The heating, ventilation and air conditioning unit according to claim 1, wherein a filter is arranged downstream of the fourth aperture.

12. The heating, ventilation and air conditioning unit according to claim 1, arranged for mounting in a vehicle so that the first aperture faces a forward direction of the vehicle in which the HVAC unit is intended to be mounted.

13. The heating, ventilation and air conditioning unit according to claim 1, arranged for mounting in a vehicle so that the second aperture faces an upward direction of the vehicle in which the HVAC unit is intended to be mounted, the upward direction being opposite a ground facing direction.

14. The heating, ventilation and air conditioning unit according to claim 1, arranged for mounting in a vehicle so that the third aperture faces a forward direction of the vehicle in which the HVAC unit is intended to be mounted.

15. The heating, ventilation and air conditioning unit according to claim 1, wherein the first door is a butterfly type door.

16. The heating, ventilation and air conditioning unit according to claim 1, wherein the second door is a barrel type door.

17. The heating, ventilation and air conditioning unit according to claim 1, wherein the third door is a barrel type door.

18. A heating, ventilation and air conditioning unit comprising:
a case defining a first aperture, a second aperture, a third aperture, and an outlet aperture,
the first aperture being arranged to receive an exterior airflow, the second aperture being arranged to receive a first interior airflow, the third aperture being arranged to receive a second interior airflow, the outlet aperture being arranged to evacuate air outside of the case;
a first door rotatably attached to the case, the first door being movable between an open position where the first aperture is open, a closed position where the first aperture is closed, and a partially-open position where the first aperture is partially open;
a second door, rotatably attached to the case, the second door being movable between an open position where the second aperture is open and a closed position where the second aperture is closed;
a third door rotatably attached to the case, the third door being movable between an open position where the third aperture is open, a closed position where the third aperture is closed;
wherein the first door is arranged to partially allow the exterior airflow in its closed position;
wherein the case defines a fourth aperture arranged between the first aperture and the outlet aperture, and
wherein a filter is arranged downstream of the fourth aperture.

19. A heating, ventilation and air conditioning unit comprising:
a case defining a first aperture, a second aperture, a third aperture, and an outlet aperture,
a first door rotatably attached to the case, the first door being movable between an open position where the first aperture is open, a closed position where the first aperture is closed, and a partially-open position where the first aperture is partially open;
a second door, rotatably attached to the case, the second door being movable between an open position where the second aperture is open and a closed position where the second aperture is closed;
a third door rotatably attached to the case, the third door being movable between an open position where the third aperture is open, a closed position where the third aperture is closed;
wherein the first door is arranged to partially allow an exterior airflow in its closed position;
wherein the case defines a fourth aperture arranged between the first aperture and the outlet aperture, and
wherein the third door seals the fourth aperture when it is in an open position with respect to the third aperture.

20. The heating, ventilation and air conditioning unit according to claim 19, wherein a filter is arranged downstream of the fourth aperture.

* * * * *